United States Patent Office 3,451,300
Patented June 24, 1969

3,451,300
PNEUMATIC SUPPORT FOR FLEXIBLE TABLE TOP
Richard C. Messinger, Cincinnati, Ohio, assignor to The Cincinnati Milling Machine Co., Cincinnati, Ohio, a corporation of Ohio
Filed Sept. 7, 1967, Ser. No. 666,096
Int. Cl. B62d 5/08, 7/16; B23q 3/02
U.S. Cl. 83—648                                9 Claims

ABSTRACT OF THE DISCLOSURE

A material cutting machine has a flexible band upon which material to be cut is supported. The opposite ends of the flexible band are fixedly attached to a fixed support structure whereby the band forms the top of a table. Cutting means is supported on a carriage, which has upper and lower rolls cooperating with the flexible band to form a loop in the band into which the cutting means may extend. As the carriage moves longitudinally, the loop in the flexible band moves therewith. Each side of the carriage has a groove therein to receive the side of the flexible band to form an air seal therebetween. Air under pressure is introduced into the interior of the frame, which cooperates with the flexible band to form a chamber. This air under pressure supports the portions of the band between the carriage and each end of the frame. The frame has means to limit the upward movement of the sides of the belt, and the carriage has means, which extend between the rolls, to limit movement of the sides of the band disposed in the grooves in the carriage. In another embodiment of the invention, an air bag is disposed beneath the band and supports the portions of the band between the carriage and each end of the frame.

---

In one type of material cutting machine, the material, which is to be cut, is supported on a flexible band having both ends fixed to support structure, which functions as a table. The band, which defines the table top, is threaded through spaced rollers on a carriage to define a loop in the band whereby an aperture or passage is provided in the table top at the carriage. When the carriage, which has cutting means mounted thereon and extending through the aperture or passage in the table top for cutting the material supported on the table top without interference with the table top, is moved longitudinally, the aperture or passage moves therewith.

Since the rollers on the carriage support the flexible band only adjacent the aperture or passage, it is necessary to support the remainder of the flexible band. This is particularly significant when a heavy load is disposed on the table top. Because of the longitudinal movement of the carriage relative to the band, stationary support rollers or the like may not be employed in a cutting machine having a flexible support band of fixed length since these would interfere with the longitudinal movement of the carriage.

The present invention satisfactorily solves the problem of providing support to the flexible band substantially throughout its length without interfering with the longitudinal movement of the carriage on which the cutting means is supported. Thus, the present invention permits heavy loads to be cut by a cutting machine having a flexible band of fixed length on which the material is supported with the carriage being movable longitudinally relative thereto.

Accordingly, an object of this invention is to provide a pneumatic support for a flexible band without interference with longitudinal movement of a carriage, which carries the cutting means for cutting material supported on the band, relative to the band.

Other objects of this invention will be readily perceived from the following description, claims, and drawings.

This invention relates to an apparatus comprising a frame and a flexible band carried by the frame. A carriage is mounted on the frame for movement longitudinally along the frame relative to the band with at least a portion of the carriage extending below the band. The apparatus has means to apply pneumatic pressure against at least the portions of the band extending between the carriage and adjacent each end of the frame to support the band.

The attached drawings illustrate preferred embodiments of the invention, in which FIGURE 1 is a side elevational view, partly broken away, of a material cutting machine having a flexible band supported by the pneumatic support means of the present invention;

Figure 1:
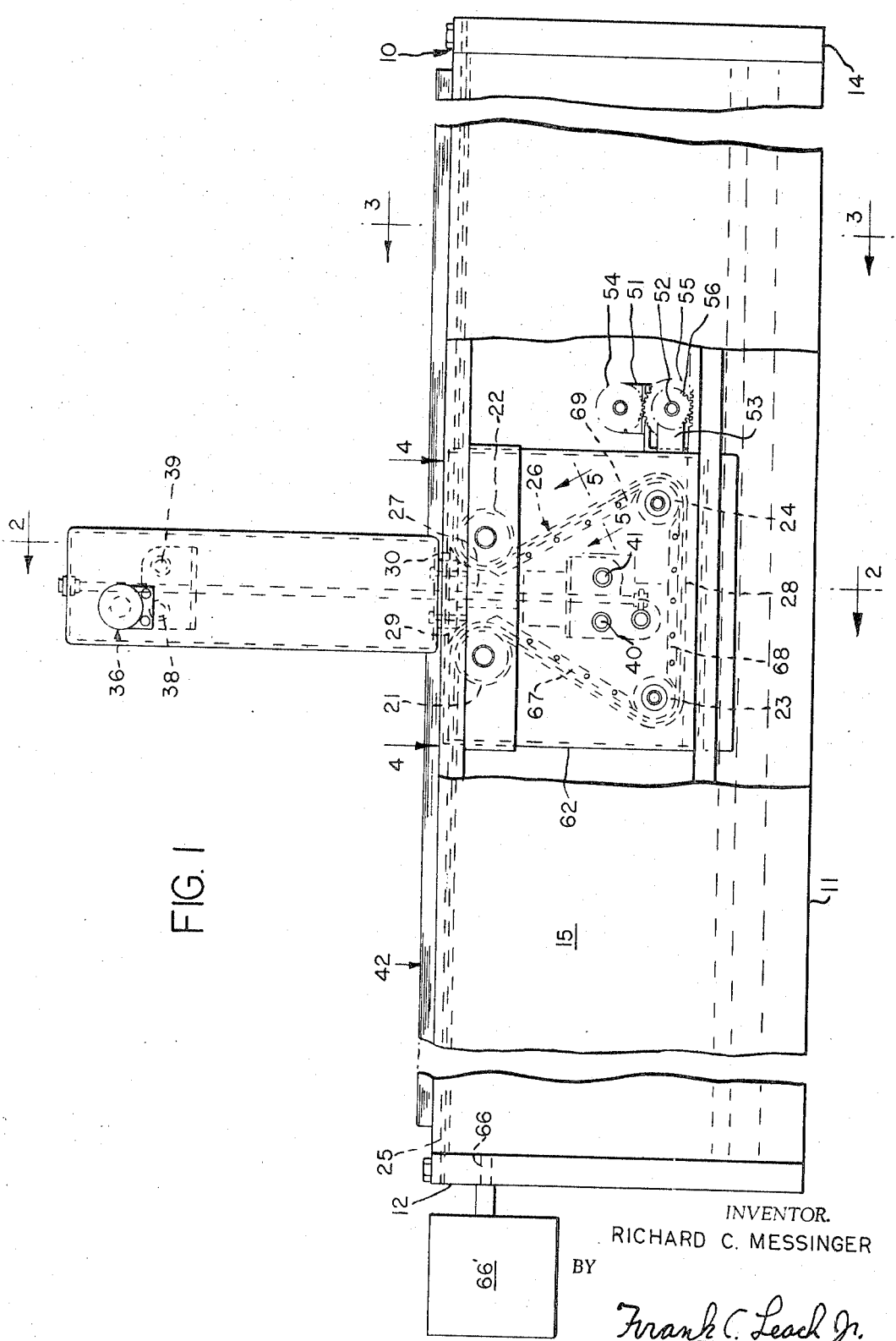

Referring to the drawings and particularly FIGURE 1, there is shown an elongated frame 10 having a base 11 and end plates 12 and 14. A side plate 15 extends upwardly from the base 11 between the end plates 12 and 14. A similar side plate 16 (see FIGURES 2 and 3) extends upwardly from the base 11 between the end plates 12 and 14 and on the opposite side from the side plate 15.

The side plate 15 has a side channel 17 fixedly secured adjacent the upper end of the side plate 15 and extending inwardly towards the side plate 16. The channel 17 extends between the end plates 12 and 14 in the same manner as the side plate 15.

Figure 2:
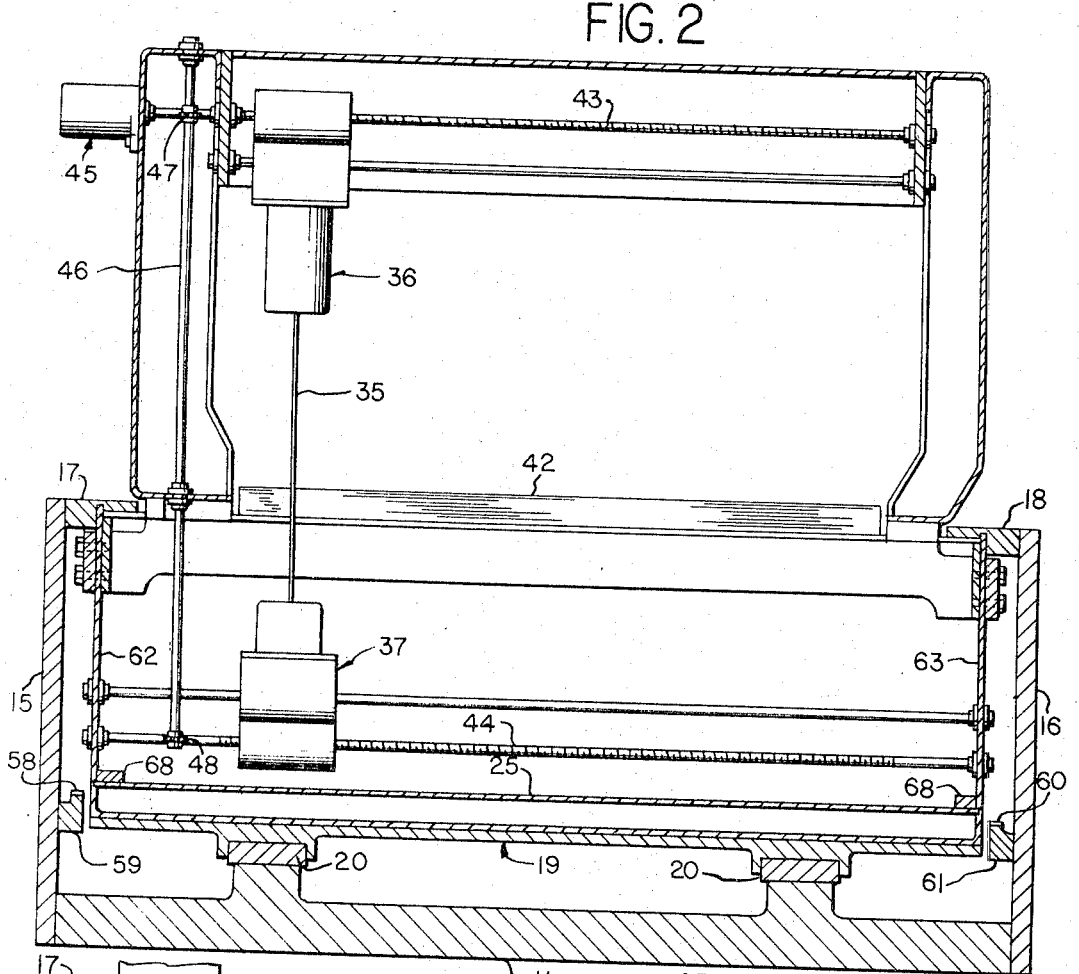
FIGURE 2 is a sectional view of the cutting machine of FIGURE 1 and taken along line 2—2 of FIGURE 1.
Figure 3:
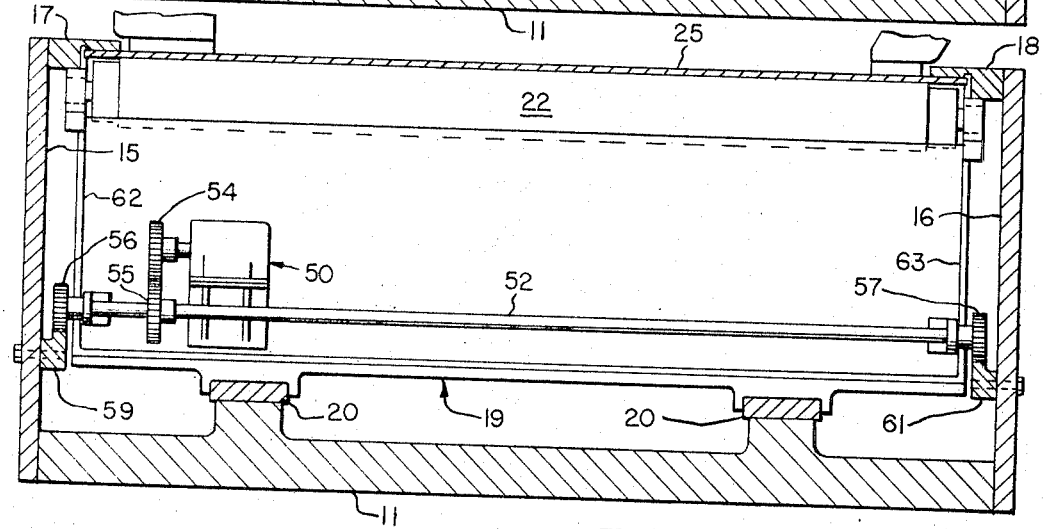
FIGURE 3 is a sectional view of a portion of the cutting machine of FIGURE 1 and taken along line 3—3 of FIGURE 1.

A side channel 18 is fixedly secured to the upper end of the side plate 16 and extends inwardly from the side plate 16 towards the side plate 15 as shown in FIGURES 2 and 3. The side channel 18 extends between the end plates 12 and 14 in the same manner as the side plate 16.

A carriage 19 is mounted on ways 20 (see FIGURES 2 and 3) in the base 11 of the frame 10 for longitudinal movement along the frame 10. The carriage 19 has two upper rolls 21 and 22 (see FIGURE 1), which are horizontally spaced from each other, rotatably mounted thereon. The carriage 19 also has two lower rolls 23 and 24 rotatably mounted thereon and spaced further horizontally from each other than the rolls 21 and 22 are horizontally spaced from each other.

An elongated flexible band or belt 25 has one end connected to the top of the end plate 12 and its other end secured to the top of the end plate 14. The flexible band or belt 25 may be formed of any suitable material such as leather, fabric, wire mesh, or thin stainless steel, for example.

The band 25, which is longer than the frame 10, passes over the upper rolls 21 and 22 and under the lower rolls 23 and 24 to define a loop 26 at the carriage 19. With the upper rolls 21 and 22 more closely spaced together than the lower rolls 23 and 24, a narrow throat 27 in the loop 26 is defined between the upper rolls 21 and 22 while a broad base 28 is provided between the lower rolls 23 and 24.

Figure 4:
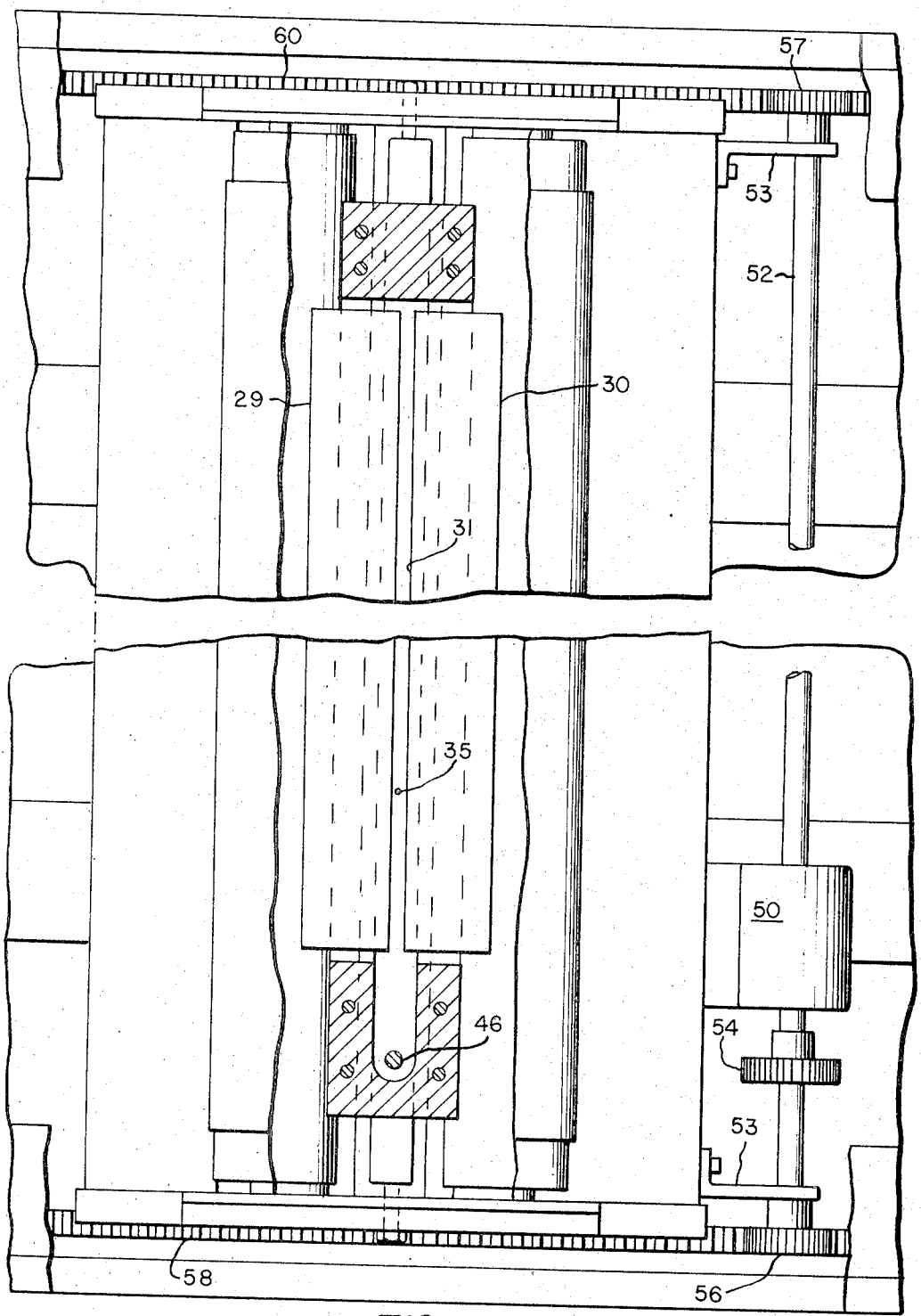
FIGURE 4 is a top plan view, partly in section, of a portion of the structure of FIGURE 1 and taken along line 4—4 of FIGURE 1.

The carriage 19 supports a pair of throat way sections 29 and 30 thereon to reduce the narrow throat 27 to a small, transverse gap 31 (see FIGURE 4). Each of the throat way sections 29 and 30 is beveled (see FIGURE 1) to cooperate with the curved portions of the flexible band 25 passing around the upper rolls 21 and 22.

The carriage 19 has a cutting blade 35 (see FIGURES 2 and 4), which extends through the gap 31, mounted thereon for movement therewith. The cutting blade 35 is adapted to be moved transversely relative to the carriage 19 through the gap 31.

The cutting blade 35 extends between an upper slide 36 and a lower slide 37 (see FIGURE 2). The upper slide 36 is slidably mounted on a pair of parallel shafts 38 and 39 (see FIGURE 1), which extend across the frame 10 above the top of the band 25. The lower slide 37 is slidably supported on a pair of parallel shafts 40 and 41, which extend across the frame 10 below the portion of the band 25 on which material 42 is supported for cutting.

The cutting blade 35 is reciprocated by mechanism (not shown) in the slides 36 and 37. The cutting blade 35 may not be circular in cross section and have small barbs (not shown) around its periphery to cut in any direction.

A screw 43 (see FIGURE 2) is threadedly received in the upper slide 36, and a screw 44 is threadedly received in the lower slide 37. The screw 43 is rotated by a reversible motor 45 connected thereto.

A vertical shaft 46 is connected to the upper screw 43 by helical gearing 47 and to the lower screw 44 by helical gearing 48. Thus, the motor 45 drives the screws 43 and 44 in unison in one direction or the other. Accordingly, the slides 36 and 37 move in unison, one above the other, in one direction or the other across the carriage 19.

Longitudinal movement of the carriage 19 on the frame 10 relative to the band 25 is produced by a motor 50 (see FIGURES 3 and 4), which is mounted on a bracket 51 (see FIGURE 1) of the carriage 19. The motor 50 rotates a shaft 52, which is rotatably mounted in brackets 53 (one shown in FIGURE 1 and both shown in FIGURE 4) on the carriage 19, through a gear 54 on the shaft of the motor 50 and a gear 55 on the shaft 52.

The shaft 52 has gears 56 and 57 (see FIGURES 3 and 4) attached at its opposite ends for rotation therewith. The gear 56 meshes with a rack 58 on the top of a side channel 59, which is secured to the side plate 15 of the frame 10. The gear 57 meshes with a rack 60 on the top of a side channel 61, which is secured to the side plate 62 of the frame 10.

Accordingly, when the motor 50 is energized, longitudinal movement of the carriage 19 occurs. The direction of movement of the carriage 19 depends on the direction of rotation of the motor 50.

Therefore, the cutting blade 35 may form various desired patterns in the material 42, which is supported on the flexible band 25. The cutting blade 35 is moved longitudinally with the carriage 19 when the motor 50 is rotated while the cutting blade 35 is moved transversely through the gap 31 when the slides 36 and 37 are moved through energization of the motor 45. Thus, universal movement of the cutting blade 35 relative to the material 42 occurs.

The carriage 19 includes a pair of substantially rectangular side plates 62 and 63. The side plates 62 and 63 have the shafts of the rolls 21–24 rotatably journaled therein.

Figure 5:
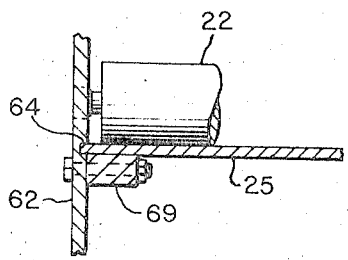
FIGURE 5 is an enlarged sectional view showing one side of the flexible band supported by the carriage.
Figure 6:
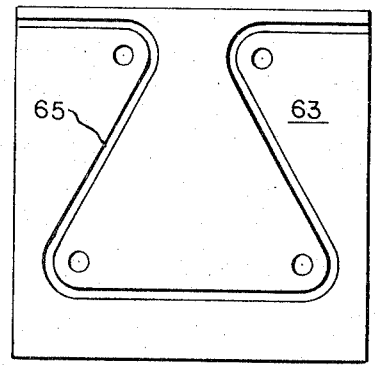
FIGURE 6 is a side elevational view of one of the side plates of the carriage having a groove formed therein to receive the flexible band.

The side plate 62 has a groove 64 (see FIGURE 5) milled therein to receive one side of the flexible band 25. As shown in FIGURE 6, the plate 63 of the carriage 19 has a groove 65 milled therein to receive the other side of the flexible band 25. The grooves 64 and 65 are similar and have a configuration to permit the band 25 to form the desired loop 26 about the upper rolls 21 and 22 and the lower rolls 23 and 24.

The band 25 cooperates with the frame 10 to form a substantially enclosed chamber into which a gas such as air, for example, under pressure may be admitted through a passage 66 in the end plate 12 of the frame 10. The passage 66 is connected to a suitable source of pressure such as a compressor 66', which may be employed to maintain the enclosed chamber at a substantially constant pressure above atmospheric pressure such as ten p.s.i.

When the chamber is supplied with air through the passage 66, the portions of the band 25 extending between each side of the carriage 19 and the end plates 12 and 14 of the frame 10 will be supported by this air pressure. The sides of the portions of the band 25 between the carriage 19 and the end plates 12 and 14 of the frame 10 would tend to raise slightly. However, the side channels 17 and 18 engage the tops of the flexible band 25 as shown in FIGURE 3 to prevent the sides of the band 25 from lifting. Because of the weight of the band 25, the remainder of the band 25 will not tend to be lifted. Furthermore, the weight of the material 42 also will aid in preventing the band 25 from raising due to the pneumatic pressure applied thereto.

In a similar manner, the pneumatic pressure also tends to urge the sides of the band 25, which are disposed in the grooves 64 and 65 of the carriage 19, out of the grooves 64 and 65. Accordingly, metallic strips are mounted on each of the side plates 62 and 63 of the carriage 19 to cooperate with the sides of the band 25 to prevent the pneumatic pressure from forcing the sides of the band 25 out of the grooves 64 and 65.

As shown in FIGURE 1, the plate 62 has a strip 67 extending from adjacent the upper roll 21 to adjacent the lower roll 23, a strip 68 extending between the lower rolls 23 and 24, and a strip 69 extending between the lower roll 24 and the upper rolls 22. The side plate 63 of the carriage 19 has similar metal strips thereon extending in the same manner. Each of the strips is secured to the appropriate side plates 62 and 63 by suitable means such as bolts and nuts.

The side plates 62 and 63 do not have any metal strips adjacent the portions of the band 25 extending from the upper rolls 21 and 22 to the ends of the side plates 62 and 63. These portions of the band 25 are disposed in the same horizontal plane as the portions of the band 25 between each end of the carriage 19 and the end plates 12 and 14. Accordingly, the side channels 17 and 18 prevent any lifting of the sides of these portions of the band 25 out of the milled grooves 64 and 65 by the pneumatic pressure.

Considering the operation of a material cutting machine using the pneumatic support means of the present invention, the longitudinal movement of the carriage 19 in either direction merely changes the portion of the band 25 that forms the loop 26. However, the pneumatic pressure, which is being applied through the passage 66 into the enclosed chamber, continuously supports the portions of the band 25 between each end of the carriage 19 and the end plates 12 and 14.

While there may be some slight leakage of the air within the chamber through the milled grooves 64 and 65 and between the band 25 and the side channels 17 and 18, the compressor 66' will automatically increase the pneumatic pressure within the chamber when its decreases to a predetermined value. Thus, sufficient support is always provided to the horizontal portions of the band 25.

Figure 7:
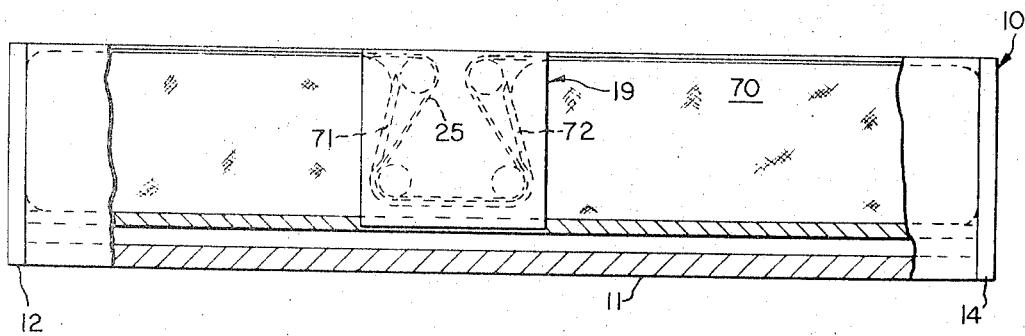
FIGURE 7 is a side elevational view showing another embodiment of the pneumatic support means of the present invention.

Another embodiment of the pneumatic support means for the flexible band 25 is shown in FIGURE 7. Instead of continuously supplying air under pressure to the interior of a substantially enclosed chamber, a pressurized and sealed bag 70 is disposed within the frame 10. The bag 70 is sealed with a gas such as air, for example, therein at a desired pressure above atmospheric pressure such as ten p.s.i., for example.

When using the pressurized bag 70, it would be necessary to mount the motor 50 exterior of the carriage 19. Furthermore, the shaft 52 would have to be disposed within the loop 26 of the band 25. This also would require that the ways 20 be disposed outside of the width of the band 25.

With the foregoing changes, the pressurized bag 70 will support at least the portions of the flexible band 25 extending from the ends of the carriage 19 to substantially the end plates 12 and 14 of the frame 10. The carriage 19 would have guide members 71 and 72 extending between the side plates 62 and 63 to prevent the pressurized bag 70 from engaging any of the rolls 21–24 or the portions of the band 25 passing thereover.

While the cutting blade 35 has been described as being circular and being formed with barbs on its periphery, any other type of suitable cutting blade may be employed. For example, any of the cutting blades shown and described in the copending patent application of George W. Sederberg for "Material Cutting Machine Having Reciprocating Cutting Blade," Ser. No. 636,965, filed May 8, 1967, and assigned to the same assignee as the assignee of the present application, could be employed.

An advantage of this invention is that heavy loads may be supported on a moving aperture table. Another advantage of this invention is that it eliminates any movable structure so that there is no interference with the longitudinally movable carriage, which supports the cutting means.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. An apparatus comprising:
a frame;
a flexible band carried by said frame;
a carriage mounted on said frame for movement longitudinally along said frame relative to said band, at least a portion of said carriage extending below said band;
and means to apply pneumatic pressure against at least the portions of said band extending between said carriage and adjacent each end of said frame to support said band.

2. The apparatus according to claim 1 in which said means to apply pneumatic pressure comprises a pressurized pneumatic bag disposed within said frame and beneath said band.

3. The apparatus according to claim 1 in which:
said frame and said band cooperate to form a substantially enclosed chamber;
and said means to apply pneumatic pressure comprises means to supply gas under pressure to the interior of said chamber to apply pneumatic pressure against substantially the entire length of said band.

4. The apparatus according to claim 3 in which:
said carriage has grooves therein to receive the sides of said band;
and said frame has means to engage the sides of said band between said carriage and the ends of said frame to limit movement of said band by the pneumatic pressure within said chamber.

5. The apparatus according to claim 4 including:
limit means carried by said carriage and engaging the portion of said band within said grooves to limit movement of said band by the pneumatic pressure within said chamber.

6. The apparatus according to claim 4 in which:
said band defines a loop at said carriage;
and a tool is carried by said carriage, said tool operating on work which is supported by said band and spans said loop of said band at said carriage.

7. The apparatus according to claim 5 in which:
said band defines a loop at said carriage;
and a tool is carried by said carriage, said tool operating on work which is supported by said band and spans said loop of said band at said carriage.

8. The apparatus according to claim 6 in which:
said carriage has a plurality of rolls mounted thereon with said limit means extending between said rolls adjacent each side of said band;
and said band is threaded through said rolls to define said loop of said band.

9. The apparatus according to claim 8 in which:
said plurality of rolls on said carriage includes: a pair of horizontally spaced upper rolls; and at least one lower roll thereon;
said band passing over said upper rolls and under said lower roll to define said loop of said band;
and said tool being disposed between said upper rolls.

References Cited

UNITED STATES PATENTS 3,262,348  7/1966  Wiatt et al.

JAMES M. MEISTER, *Primary Examiner.*

U.S. Cl. X.R.

83—647; 269—296, 310

UNITED STATES PATENT OFFICE
CERTIFICATE OF CORRECTION

Patent No. 3,451,300                        June 24, 1969

Richard C. Messinger

It is certified that error appears in the above identified patent and that said Letters Patent are hereby corrected as shown below:

Column 1, line 54, "band" should read -- band, --. Column 3, line 22, cancel "not"; line 48, "62" should read -- 61 --. Column 4, line 33, "rolls" should read -- roll --.

Signed and sealed this 21st day of April 1970.

(SEAL)
Attest:

Edward M. Fletcher, Jr.
Attesting Officer

WILLIAM E. SCHUYLER, JR.
Commissioner of Patents